Aug. 19, 1924.

H. A. FOOTHORAP

1,505,385

DEBIT AND CREDIT DISTRIBUTION FOR WRITING ADDING MACHINES

Filed Dec. 31, 1920  9 Sheets-Sheet 7

Inventor,
Harry A. Foothorap.
By
Attorney

Aug. 19, 1924.

H. A. FOOTHORAP

DEBIT AND CREDIT DISTRIBUTION FOR WRITING ADDING MACHINES

Filed Dec. 31, 1920   9 Sheets-Sheet 9

1,505,385

Inventor,
Harry A. Foothorap.
By L. G. Julihn
Attorney

Patented Aug. 19, 1924.

1,505,385

UNITED STATES PATENT OFFICE.

HARRY ARTHUR FOOTHORAP, OF HARRISBURG, PENNSYLVANIA, ASSIGNOR TO ELLIOTT-FISHER COMPANY, A CORPORATION OF DELAWARE.

DEBIT AND CREDIT DISTRIBUTION FOR WRITING-ADDING MACHINES.

Application filed December 31, 1920. Serial No. 434,250.

*To all whom it may concern:*

Be it known that HARRY A. FOOTHORAP, a citizen of the United States, residing at Harrisburg, in the county of Dauphin and State of Pennsylvania, has invented certain new and useful Improvements in Debit and Credit Distribution for Writing-Adding Machines, of which the following is a specification, reference being had therein to the accompanying drawing.

This invention relates to writing-adding machines of that type characterized by printing mechanism for writing numbers in one or more columns and adding devices or registers operated by a master actuator which traverses the register to accumulate the total of numbers printed in the column.

The object of the invention is to provide a novel construction and arrangement of parts whereby numbers having different significance, as for instance debits and credits, may be accumulated in separate adding devices or registers when said numbers are printed in the same column.

A subordinate object of the invention is the provision of means whereby a translation of the relative position of the work sheet with respect to a plurality of registers may be effected to permit numbers printed in a single column area to be distributed to a plurality of registers.

To the accomplishment of the recited objects and others, which will more fully appear as the succeeding description is developed, one embodiment of the invention resides in the construction to be described, illustrated in the accompanying drawings and defined in the appended claims.

The machine illustrated for the purpose of this disclosure is the ordinary Elliott-Fisher bookkeeping machine of commerce which includes a flat platen 1 located between tracks or guides 2 connected to form a platen frame by transverse members 3. Movable on the stationary guides 2 is a line space frame 4, movable longitudinally of the platen to space the lines printed or typewritten by printing mechanism 5 mounted on a carriage 6 movable for letter spacing on the frame 4. In rear of the carriage 6 the frame 4 is equipped with what is known as a register bar 7 carried by register supports 8, rigid with the frame 4. The bar 7 is adapted to support a series of adding devices or registers 9—9ᵃ—10—11—12—13—13ᵃ and 14. The number and dimensions of the registers is arbitrary, being variable according to the work to be performed. The illustration shows the registers 9 and 9ᵃ mounted in the same frame and 13 and 13ᵃ similarly mounted because these double registers are designed to accumulate different but related items, as for instance, debits and credits. It is unnecessary to describe these adding devices or registers in detail. Suffice it to say that each includes a series of number wheels occupying progressive denominational positions and having the digits, naught to nine, distributed about their peripheries and displayed one at a time opposite a sight opening. Associated with these wheels is the usual carrying mechanism, whereby, when the limit of value of any denomination is reached by the rotation of the number wheel, the value thus accumulated will be transferred to the wheel of next higher denomination.

So also, the actuating mechanism for these registers being of well known character requires no specific description. It may be stated however that this actuating mechanism includes a master wheel 15, mounted on and laterally movable with the carriage 6 and rotatable by numeral keys, a number of increments corresponding to the value of the digits printed in a given denominational position on the work sheet. As the carriage advances across the column to print the digits included in a number the master wheel is advanced to successive number wheels. Thus, the denominational position of the printing mechanism in the column and the denominational position of the master wheel in the register correspond, so that the amount accumulated by the register corresponds in both numerical and denominational value to the numerical and denominational values of the digits printed in the column.

Figure 1:
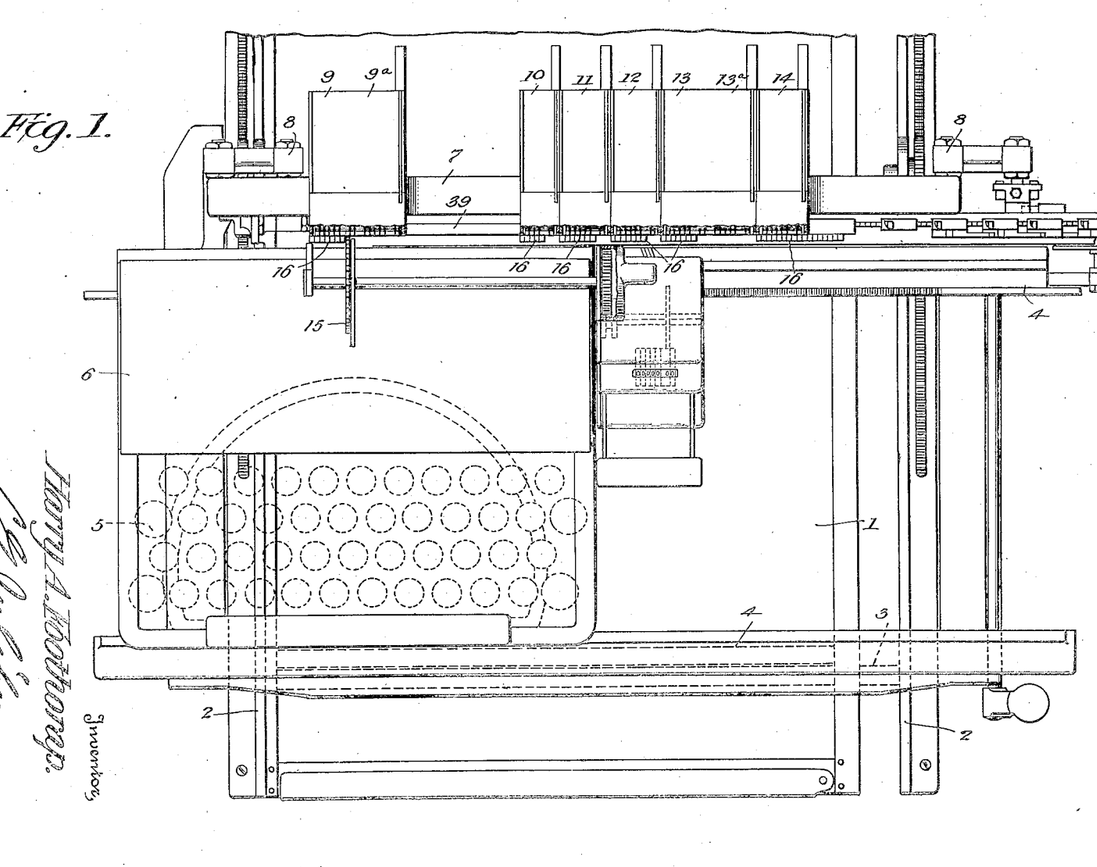
Fig. 1 is a plan view of an Elliott-Fisher bookkeeping machine equipped with my invention.
Figure 2:
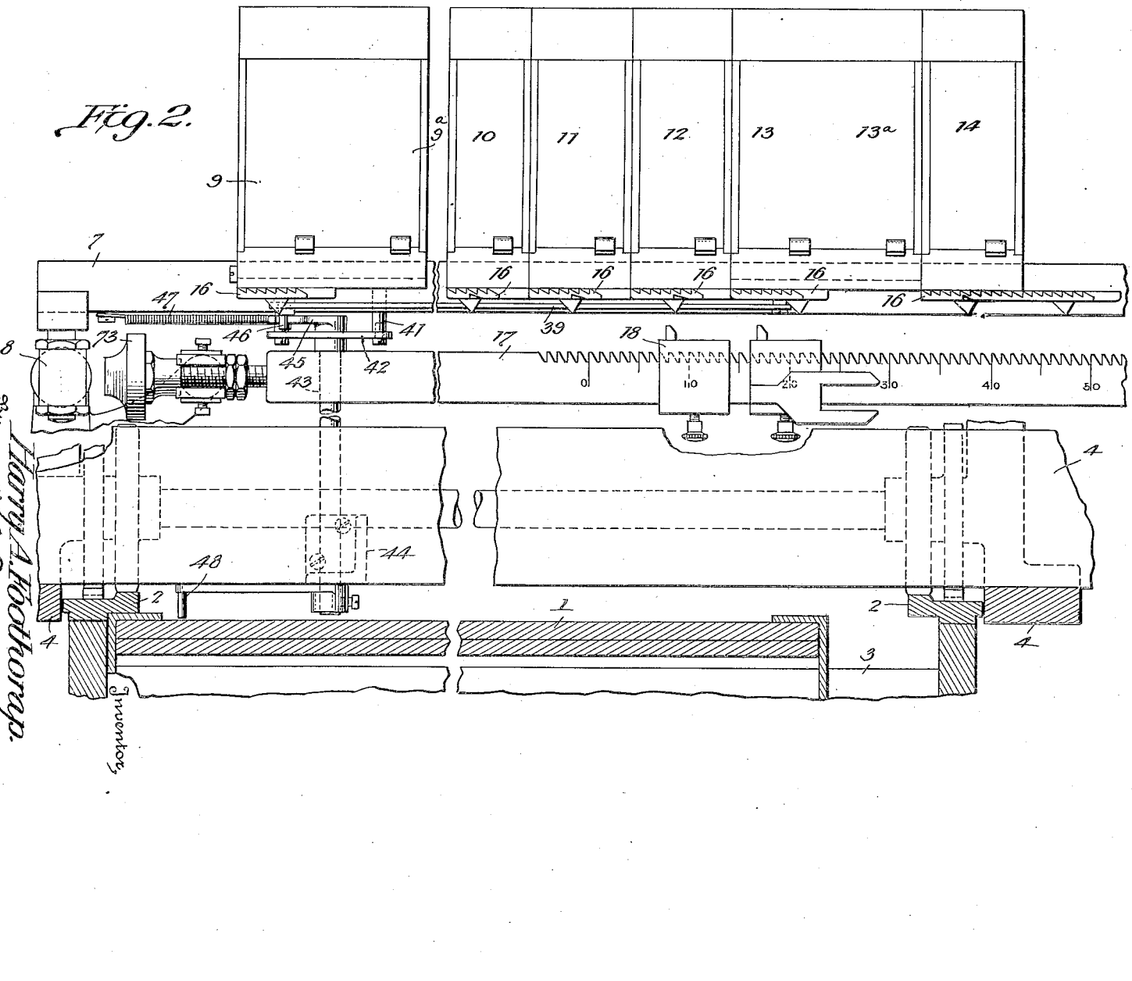
Fig. 2 is a rear elevation of the same, partly in section.
Figure 3:
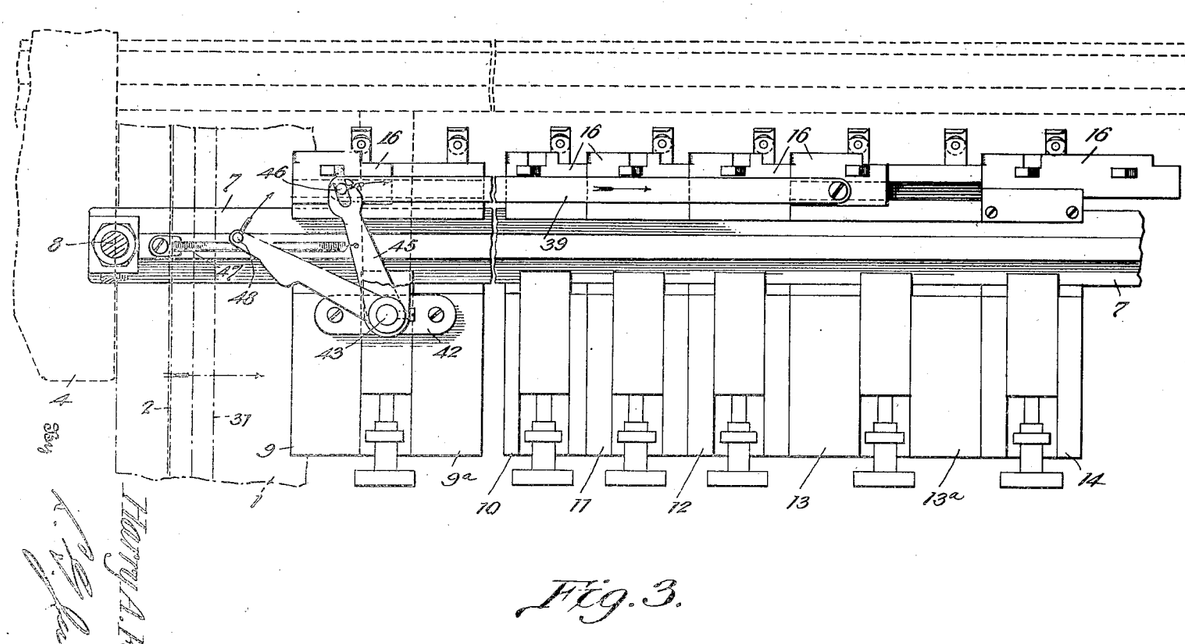
Fig. 3 is a bottom plan view of the series of registers and associated parts with a portion of the machine structure in dotted lines.

In addition to the coaction between the master wheel and the registers there is necessarily a coaction between other parts associated with the carriage and frame, respectively, to control certain functions of the adding mechanism. The specific character of these mechanisms is not of moment for the purpose of this disclosure but in order to make the succeeding description clearer attention is called at this point to the fact that in the well known machine a depressor plate 16 is associated with each register for coaction with an arm mounted on the carriage and controlling certain of the operating connections of the actuating mechanism. Obviously, the plate 16 must bear a definite relation to the register in order to coact with the arm when the register and master wheel are in proper relation. Also, in this connection, attention is directed to the fact that a control bar 17 is appropriately mounted in rear of the carriage for the support of adjustable controlling devices 18 which coacts with associated mechanism to control certain phases of the adding operation.

We may now consider the fundamentals of the particular invention under discussion. If the registering and actuating mechanisms are mounted on relatively movable parts, associated with a platen, constituting a third element, it follows that a definite relation must be established between these three elements in order to effect correspondence in position of the digits printed on the work sheet and the number wheel operated in the register. Differently expressed, the register must be appropriate in position to a particular column field or area of the work sheet so that when the printing point of the machine is located in that column position the master wheel will be correspondingly located relative to the register. Therefore, if the object of this invention is to be attained, that is to say, the printing of certain numbers in a single column and the addition of certain of these numbers in one register and others of said numbers in another register, both of said registers must in some manner be placed in the appropriate relation to the single column. Obviously this can only be done in a machine of this type by shifting the two registers alternately into and out of a specified relation to the column or this relative change must be accomplished by the shifting of the column itself out of corresponding relation with one register and into corresponding relation with the other.

While I have illustrated both of these modes of attaining the same end, I will first describe the construction illustrated in the first ten figures of the drawings, to-wit: the change of relation by the lateral shifting of the platen to carry the work sheet and the column thereon into appropriate relation with different registers.

Referring first to Figures 5 to 8, inclusive, it will be seen that the platen 1 is mounted in a supplemental platen frame 19 slightly narrower than the platen frame 2 and arranged to slide laterally on the transverse bars 3 which pass through openings in the side members of the supplemental frame 19. Normally, the supplemental frame 19 and the platen carried thereby are held against the left hand side of the main platen frame by springs 20 which bear against a side wall 21 of the frame 19 and the heads 22 of posts 23 which pass through openings 24 of the wall 21 and are rigidly secured to the adjacent side member 2 of the main platen frame. The springs 20 are preferably of helical form and surround the posts 23. In order to shift the platen to the right, for the purpose of moving a column of the work sheet out of relation to one register and into relation with another, I provide a rock shaft 25 journaled at its ends in the bars 3 and having arms 26 connected by links 27 to one side of the frame 19. (See Figs. 7 and 8.) The shaft 25 is also provided with arm 28 from which may depend a connection 29 to a pedal, not illustrated, by the depression of which the shaft 25 may be rocked and the platen shifted to the right from the position illustrated in Fig. 8. To accommodate the shaft 25 during this movement, slots 30 are formed in the ends of the frame 19. It will be understood that this shifting of the platen is opposed by the springs 20 which return the platen to normal position as soon as the shaft 25 is allowed to rock back.

Attention is directed to the fact that this lateral shifting of the platen, for the purpose described, interferes in no way with the customary depression of the platen from the writing plane to facilitate the displacement and replacement of the work sheet which is ordinarily retained between the platen and the paper clamps 31, which extend along the side edges of the frame 19. The platen is guided in its vertical movement within the supplemental platen frame by the guide rollers 32 and is supported by bell cranks 33, the lower ends of which are connected by springs 34 which normally hold the platen up against the clamps 31. The depression of the platen against the resistance of the springs 34 is effected by a lever 35 fulcrumed at 36 to the frame 19 and connected at its opposite ends by means of a chain 37 to a pedal not shown. A pivotal connection is effected at an intermediate point of the lever to a bracket 38, secured to the underside of the platen proper. It will now be apparent that if with the platen in its left hand position, debits are printed in a column on the work sheet, supported by the platen, and are accumulated in the debit register 9, it is only necessary to shift the platen laterally to bring the column into proper correspondence with the credit register 9ª so that credit items may be printed in the same column with the debit items and accumulated in the credit register. The same is, of course, true with reference to the registers 13 and 13ª.

Figure 4:
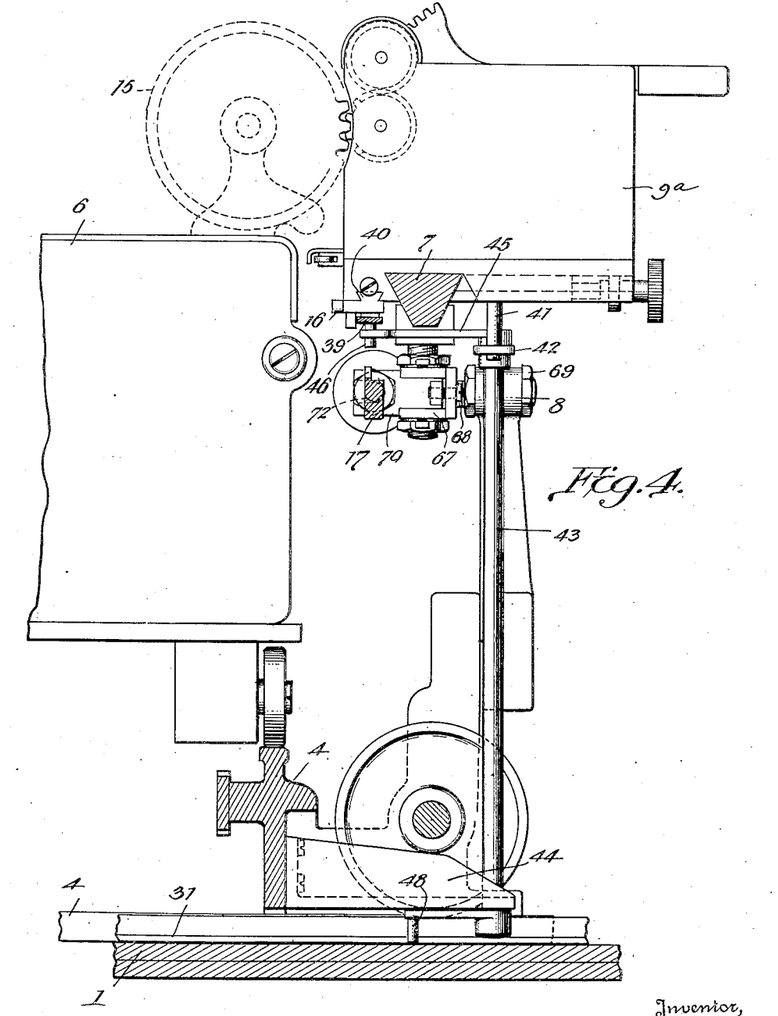
Fig. 4 is a side elevation with parts in section.
Figure 5:
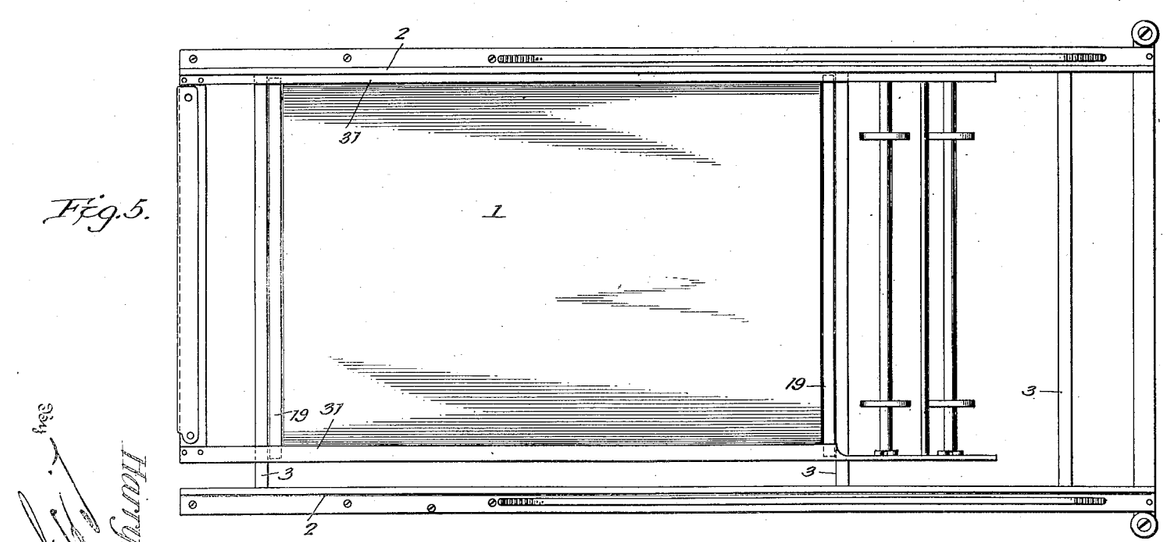
Fig. 5 is a plan view of the platen.
Figure 6:
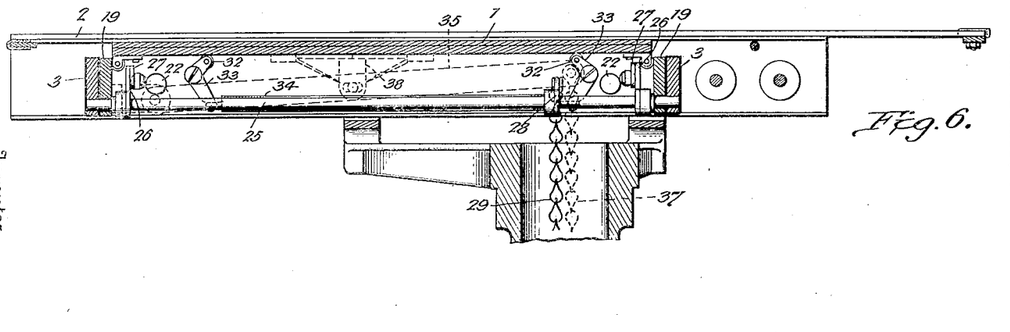
Fig. 6 is a longitudinal section thereof.
Figure 7:
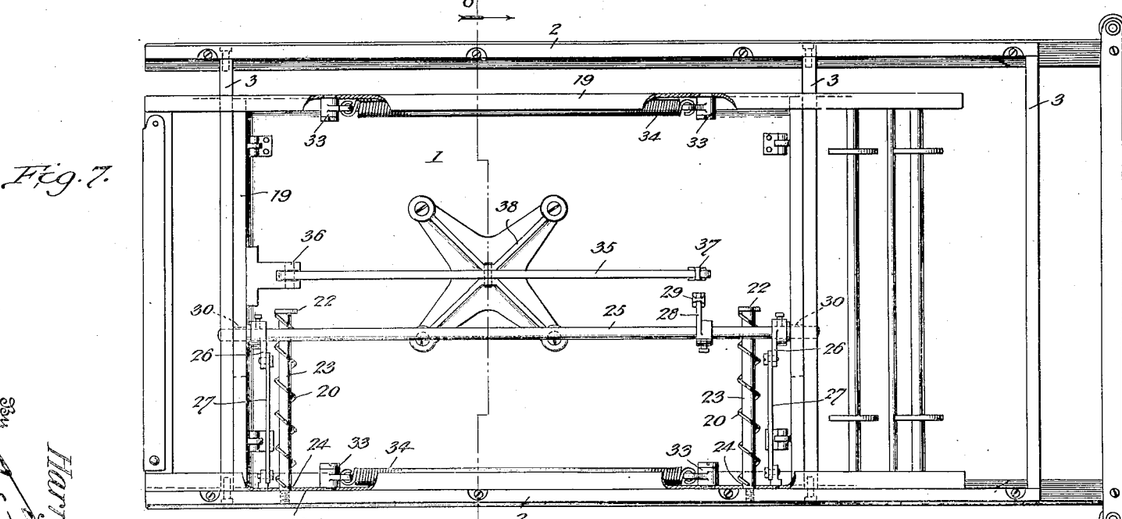
Fig. 7 is a bottom plan view of the subject matter of Fig. 5.
Figure 8:
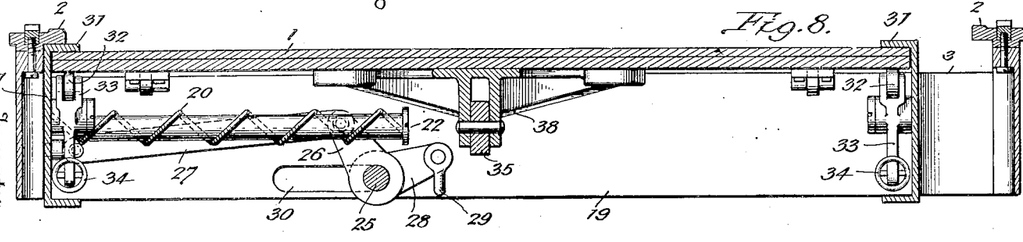
Fig. 8 is a transverse section on the line 8—8 of Fig. 7.

It will be noted, however, that the double registers 9 and 9ª are each provided with a single depressor plate 16 (see Fig. 1) and it is obvious that this element of the control must be shifted from one register section to the other when the platen is shifted from one register position to the other. To attain this end the two depressor plates 16 of the two double registers are connected by a link 39 to compel their movement in unison, this movement being a sliding motion from one section of a double register to the other, for which purpose each of the plates 16 is provided with a slide 40 accommodated in the bottom of the register. (See Fig. 4.) Depending from one of the double registers are a pair of studs 41, to the ends of which is secured a cross bar 42 to provide a bearing for the upper end of a vertical rock shaft 43 journaled at its lower end on a bracket 44. At the upper extremity of the shaft 43 is a forwardly extending arm 45 bifurcated to engage a pin 46, pendant from one of the depressor plates, a spring 47 secured to the arm 45 and to a fixed part, serving to retain the arm and the two depressor plates at one limit of their movement. At its lower end the shaft 43 is provided with a crank 48 extended into proximity to one of the work clamps of the supplemental platen frame 19 and arranged to be engaged thereby and swung when the platen is shifted laterally. Therefore, when the platen is shifted to change the relation of the column to the registers, the crank 48, shaft 43 and arm 45 will be swung to shift the two depressor plates 16 from the debit to the credit registers so that the machine control will be reorganized automatically to accommodate the new relation.

Figure 9:
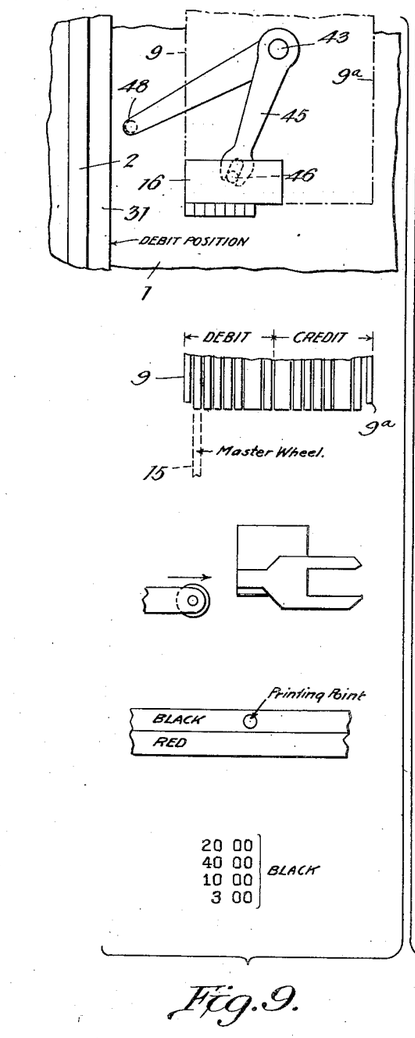
Fig. 9 is a diagrammatical group showing the relations of parts while one character of numbers, as for instance, debits, are being printed in the column and added in the debit register.
Figure 10:
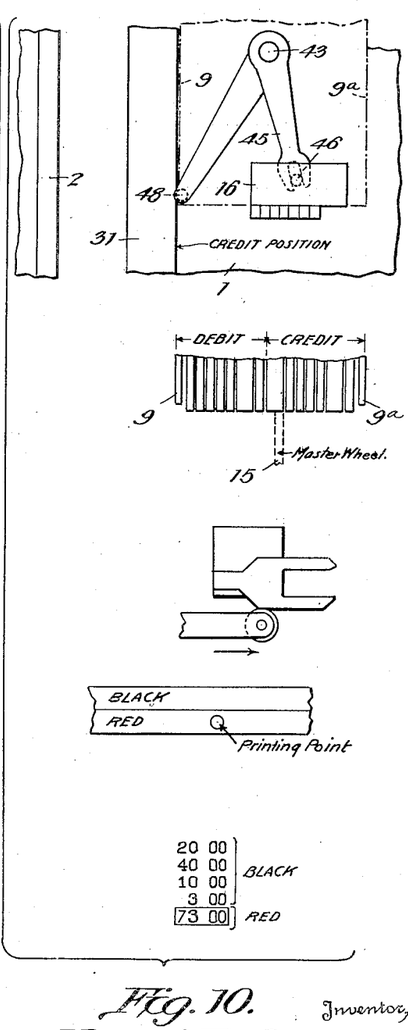
Fig. 10 is a similar view showing the relation of the same parts during the printing of other values, as for instance, credits, in the same column but in a different color and accumulated in a different register.
Figure 11:
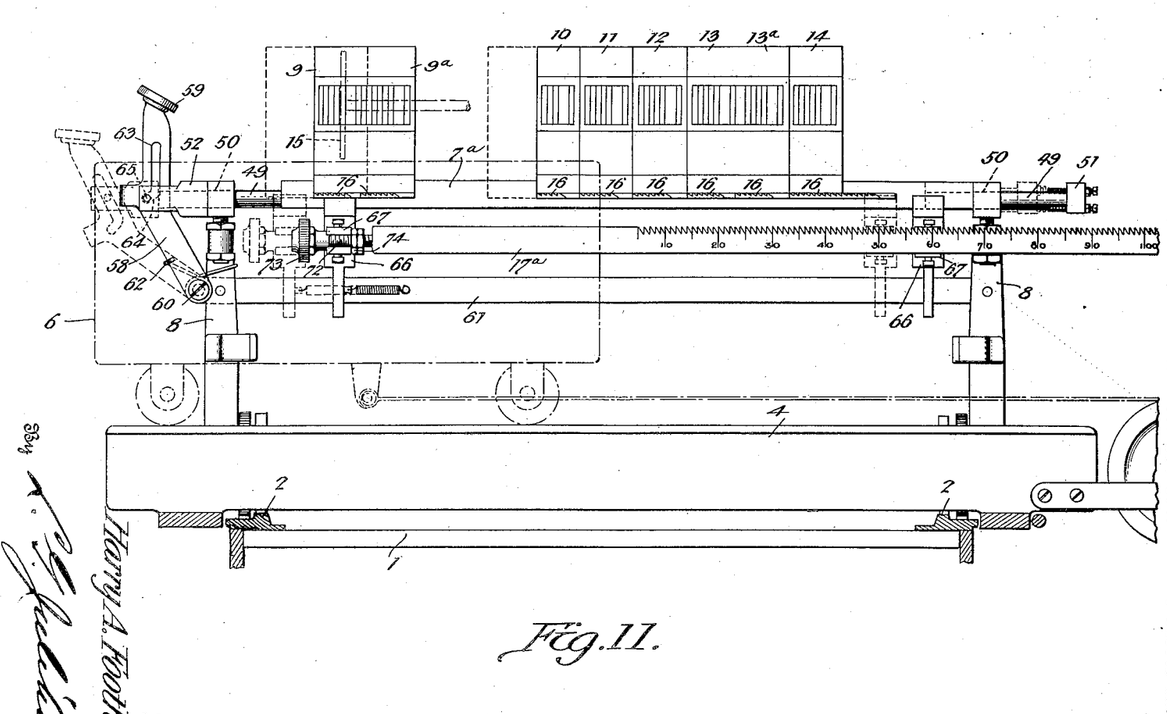
Figures 12, 13, 14, 15:
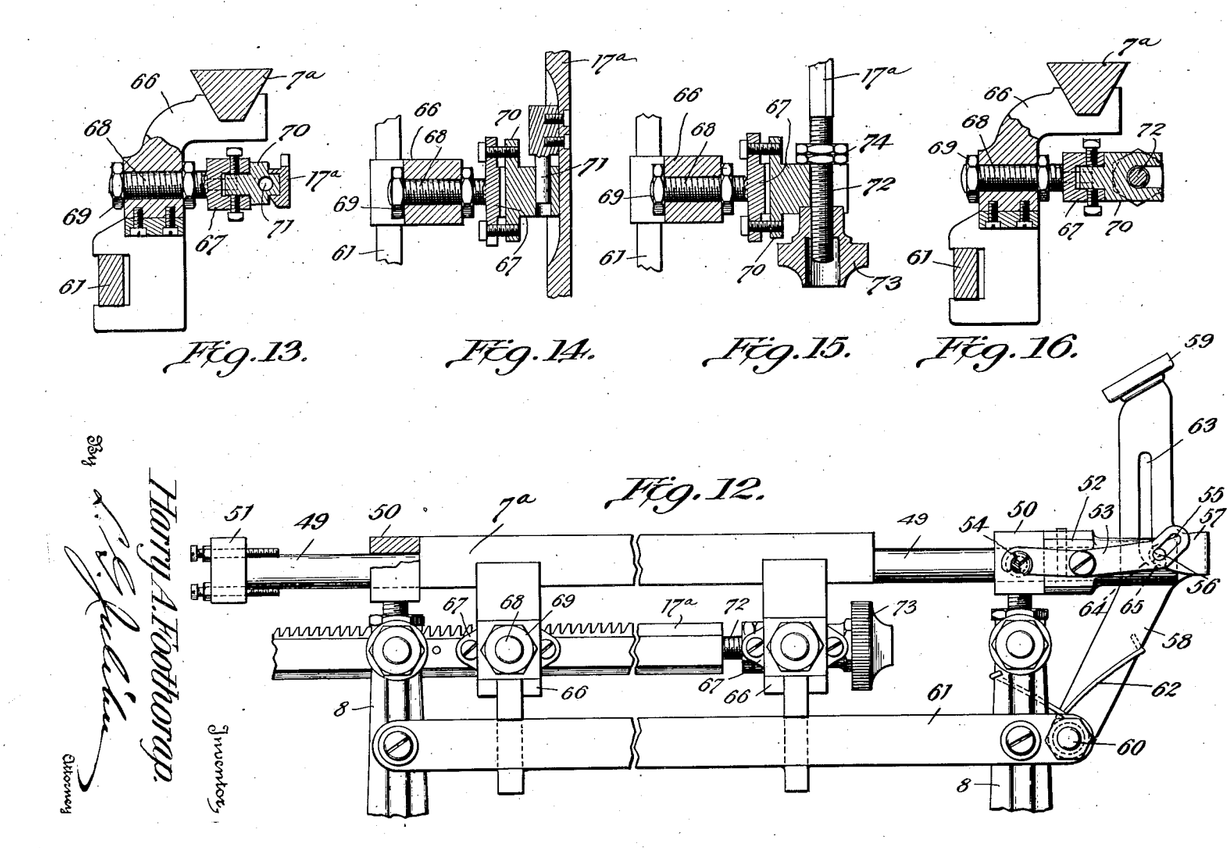

The diagrammatic illustration in Figs. 9 and 10 will now be understood. At the top of Fig. 9 the double register is shown with the depressor plate in position to control the operation of the debit register or register section. The master wheel is shown opposite the debit register and in position to operate the same. A portion of the color selecting mechanism related to this invention but not claimed herein is shown to indicate the printing of the debit characters in black, as indicated by the location of the printing point, and below the debit items are shown in column formation.

In Fig. 10 the platen has been shifted to swing the depressor plate to the credit position, the master wheel is shown opposite the credit register, the color selecting mechanism is indicated with the printing point of the machine over the red strip of the ribbon and to the column is shown added a credit item in red.

What I claim is:—

1. In a machine of the class described, the combination with a plurality of registers, of a normally stationary laterally movable platen, printing and actuating mechanism operative to print values in a column and to accumulate said values in a register, and means for shifting the platen laterally to permit other items printed in the same column to be accumulated in a different register.

2. In a machine of the class described, the combination with a plurality of registers, a platen, printing mechanism and register actuating mechanism, of control mechanism associated with the register and actuator respectively, means for changing the relation of the platen and the registers to permit different items printed in the same column position to be accumulated in different registers, and means for associating the control mechanism with either register to correspond with the change of relation between the platen and the register.

3. The combination with a plurality of normally stationary registers, a normally stationary platen, printing mechanism and actuating mechanism, of control mechanism associated with the platen and actuator respectively, and means for shifting the platen and an element of the control mechanism whereby, when the machine has been operated to print items in a column and to accumulate said items in a register, other items may be printed in the same column and accumulated in a different register.

4. In a machine of the class described, the combination with a plurality of registers, a platen, printing mechanism and register actuating mechanism, of means controlling the relation of the printing and actuating mechanisms, said means including a depressor plate, and means for repositioning the platen and registers in a lateral direction and also for repositioning the depressor plate whereby distinguishable items as for instance, debit and credit items, may be printed in the same column of a work sheet supported by the platen and accumulated in different registers.

5. The combination with a plurality of relatively stationary registers, a platen, printing mechanism and register actuating mechanism, of controlling means for determining the relation between the printing and actuating mechanisms and including a depressor plate, and means for shifting the platen and the depressor plate laterally to different positions relative to the registers whereby different values, as for instance, debit and credit items, may be printed in a single column but accumulated in different registers.

6. The combination with a plurality of stationary registers, a laterally shiftable platen, printing mechanism cooperating with the platen, actuating mechanism for the registers, and controlling mechanism for determining the relation of the printing and actuating mechanisms, and including a depressor plate shiftable to different registers, of means for shifting the platen to position the same for the accumulation in different registers of values printed in the same column, and means cooperating with the platen and controlling the position of the depressor plate.

7. The combination with a plurality of registers, a depressor plate shiftable from one to the other, a platen shiftable laterally, a connection between the platen and the depressor plate, printing mechanism cooperating with the platen, and actuating mechanism cooperating with the registers.

8. In a machine of the class described, a normally stationary platen, a plurality of normally stationary registers, printing mechanism, register actuating mechanism, controlling mechanism, and means for shifting the platen and the controlling mechanism laterally with respect to the registers.

In testimony whereof I hereunto affix my signature in the presence of two witnesses.

HARRY ARTHUR FOOTHORAP.

Witnesses:
J. AZALEA WIGFIELD,
MARSHALL H. DEAN.